(12) United States Patent
Asawa

(10) Patent No.: US 10,173,434 B2
(45) Date of Patent: Jan. 8, 2019

(54) CHECK VALVE, DIAPHRAGM PUMP, AND PRINTING APPARATUS

(71) Applicant: SEIKO EPSON CORPORATION, Tokyo (JP)

(72) Inventor: Hiroshi Asawa, Yamagata (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/677,884

(22) Filed: Aug. 15, 2017

(65) Prior Publication Data

US 2018/0056663 A1 Mar. 1, 2018

(30) Foreign Application Priority Data

Aug. 23, 2016 (JP) ................................. 2016-162493

(51) Int. Cl.
*F04B 39/10* (2006.01)
*F04B 43/02* (2006.01)
*F04B 53/10* (2006.01)
*B41J 2/175* (2006.01)
*F16K 15/16* (2006.01)
(Continued)

(52) U.S. Cl.
CPC ....... *B41J 2/17596* (2013.01); *F04B 39/1073* (2013.01); *F04B 43/02* (2013.01); *F04B 43/028* (2013.01); *F04B 53/10* (2013.01); *F04B 53/109* (2013.01); *F04B 53/1057* (2013.01);
(Continued)

(58) Field of Classification Search
CPC ...... B41J 2/175; B41J 12/17596; F04B 9/042; F04B 9/045; F04B 39/1073; F04B 43/02; F04B 43/026; F04B 43/028; F04B 43/04; F04B 43/0054; F04B 45/04; F04B 53/007; F04B 53/10; F04B 53/105; F04B 53/109; F04B 53/1092
See application file for complete search history.

(56) References Cited

U.S. PATENT DOCUMENTS 3,342,208 A 9/1967 Steffes
3,947,156 A * 3/1976 Becker ................ F04B 43/0054
417/413.1
(Continued)

FOREIGN PATENT DOCUMENTS

CH 364392 A 9/1962
EP 2546523 A2 1/2013
(Continued)

OTHER PUBLICATIONS

European Search Report issued in EP 17186578 dated Jan. 16, 2018.

*Primary Examiner* — Anh T. N. Vo
(74) *Attorney, Agent, or Firm* — Workman Nydegger

(57) ABSTRACT

Provided is a check valve including: a duckbill valve; and a support member which is inserted into an inside portion of the duckbill valve, in which the duckbill valve includes a slit which is provided on a side where fluid is discharged, an inflow port which is provided on a side where the fluid flows in, and a flow path which connects the inflow port to the slit, and in which the support member is inserted into the flow path from the inflow port, a hole for sending the fluid to the slit when flowing in from the inflow port is provided, and the hole is provided so as to be hermetically sealed by the duckbill valve when a negative pressure is applied from the inflow port side.

15 Claims, 9 Drawing Sheets

(51) Int. Cl.
  *F16K 27/02*  (2006.01)
  *F16K 15/14*  (2006.01)
(52) U.S. Cl.
  CPC ............ *F16K 15/147* (2013.01); *F16K 15/16* (2013.01); *F16K 27/0209* (2013.01)

(56) References Cited

U.S. PATENT DOCUMENTS

| | | | |
|---|---|---|---|
| 5,275,541 A * | 1/1994 | Becker | F04B 39/108 |
| | | | 137/516.21 |
| 5,785,508 A | 7/1998 | Bolt | |
| 6,089,260 A | 7/2000 | Jaworski et al. | |
| 7,401,543 B2 * | 7/2008 | Curtis | F04B 43/0054 |
| | | | 417/413.1 |
| 8,807,725 B2 * | 8/2014 | Borra | B41J 2/175 |
| | | | 347/32 |
| 8,919,917 B2 * | 12/2014 | Koike | B41J 2/125 |
| | | | 347/22 |
| 9,057,366 B2 * | 6/2015 | Becker | F04B 43/0054 |
| 2002/0057972 A1 | 5/2002 | Barinaga et al. | |
| 2013/0017110 A1 | 1/2013 | Villagomez et al. | |

FOREIGN PATENT DOCUMENTS

| | | |
|---|---|---|
| JP | 2001-248560 A | 9/2001 |
| JP | 2005-088419 A | 4/2005 |
| JP | 2008-247019 A | 10/2008 |
| JP | 2010-228148 A | 10/2010 |
| JP | 2010-241035 A | 10/2010 |
| JP | 2013-024245 | 2/2013 |

* cited by examiner

CHECK VALVE, DIAPHRAGM PUMP, AND PRINTING APPARATUS

BACKGROUND

1. Technical Field

The present invention relates to a check valve, a diaphragm pump including the check valve, and a printing apparatus including the diaphragm pump.

2. Related Art

In the related art, a diaphragm pump is used as a pump for pumping fluid. The diaphragm pump includes a fluid suction and discharge chamber which is defined by a diaphragm in the housing and changes its volume by elastic deformation of the diaphragm and a diaphragm pump which is connected to the fluid suction and discharge chamber and includes an inlet flow path connected to the fluid suction and discharge chamber via a first check valve allowing only a fluid flow in a direction facing the fluid suction and discharge chamber and an outlet flow path connected via a second check valve allowing only a fluid flow in a direction exiting from the fluid suction and discharge chamber. Then, by the diaphragm being driven to deform from a diaphragm deformation chamber side positioned on a side opposite to the fluid suction and discharge chamber with the diaphragm of the diaphragm pump interposed between the diaphragm deformation and the fluid suction and discharge chamber and by the volume of the fluid suction and discharge chamber being changed to be large or small, the pressure in the fluid suction and discharge chamber is periodically increased or decreased, and the fluid taken into the fluid suction and discharge chamber via the inlet flow path is discharged to the outlet flow path side by the necessary amount.

As a check valve used for at least one of the inlet flow path and the outlet flow path of such a diaphragm pump, for example, as described in JP-A-2013-24245, a check valve in which a support member is inserted inside a duckbill valve and the check valve designed to withstand high back pressure is introduced.

The inventor, or the like has found that in a case where the diaphragm pump described in JP-A-2013-24245 is applied to a printing apparatus that uses ultraviolet curable ink (hereinafter referred to as "UV ink") as a fluid, according to pumping of UV ink, by the duckbill valve and the support member of the check valve being repeatedly in contact with, separated from, and slid on each other, the UV ink is polymerized to generate a polymerized foreign substance, and the polymerized foreign substance adheres to and is accumulated on a periphery of an opening portion of the support member and an inside of the duckbill valve corresponding thereto. When the duckbill valve and the support member are repeatedly in contact with, separated from, and slid on each other by continuing use of the diaphragm pump in a state where the polymerized foreign substance is accumulated thereon in this manner, there is a fear that the inside of the duckbill valve, which is thinner and softer than the support member can be scraped off and be broken by the polymerized foreign substance.

In addition, in the duckbill valve, even in a slit which becomes an outflow port of the fluid in an opened state and becomes a backflow prevention valve in a closed state, the polymerized foreign substance adheres to and is accumulated by the opening and closing (contacting and separating) of the slit being repeated according to pumping of UV ink, and thus there is a fear that a liquid sending ability in the opened state and the sealing performance in the closed state are deteriorated.

In addition, in the diaphragm pump, a diaphragm which is deformed according to pumping of UV ink and the fluid suction and discharge chamber of the housing are repeatedly in contact with, separated from, and slid on each other, and thus a polymerized foreign substance is generated, is transferred by the liquid flow, adheres to and is accumulated on the support member or the duckbill valve, and thus there is a fear that the liquid feeding ability and the sealing performance are deteriorated.

SUMMARY

The invention can be realized in the following aspects or application examples.

Application Example 1

According to the application example, there is provided a check valve including, a duckbill valve, and a support member which is inserted into an inside portion of the duckbill valve, in which the duckbill valve has a slit which is provided on a side where a fluid is discharged, an inflow port which is provided on a side where the fluid flows in, and a flow path which connects the inflow port to the slit, and in which the support member is inserted into the flow path from the inflow port, in which a hole for sending the fluid to the slit when flowing in from the inflow port is provided, and in which the hole is provided to be hermetically sealed by the duckbill valve when a negative pressure is applied from the inflow port side.

According to the application example, by inserting the support member into the inside portion of the duckbill valve, a check valve that is more resistant to high back pressure than a case of a single duckbill valve can be provided, the sealing performance for preventing the backflow of fluid can be enhanced due to a double close contact structure being configured by a close contact portion between the duckbill valve and the hole of the support member and the slit of the duckbill valve by the hole of the support member being provided so as to be hermetically sealed by the inside of the duckbill valve when a negative pressure is applied from the inflow port side, and thus a highly reliable check valve can be provided.

Application Example 2

In the check valve according to the application example, the duckbill valve includes a first wall surface and a second wall surface which are a pair of inclined surfaces extending so as to converge toward a tip end side having the slit, the support member includes a third wall surface positioned inside the first wall surface and a fourth wall surface positioned inside the second wall surface, and the hole is provided on the third wall surface.

According to the application example, when the fluid flowing in from the inflow port is fed to the slit by the hole provided on the third wall surface of the support member positioned inside the first wall surface of the duckbill valve or when a negative pressure is applied from the inflow port, a sealing performance for preventing the backflow of the fluid can be enhanced due to a double close contact structure by a close contact portion between the duckbill valve and the hole of the support member and the slit of the duckbill valve.

Application Example 3

In the check valve according to the application example, a plurality of holes are provided.

According to the application example, since the contact area between the periphery of the hole of the support member and the inside of the duckbill valve can be increased, compared with a case where one hole having a large size is provided, the deformation of the portion which is in contact with the periphery of the hole of the duckbill valve is suppressed when the negative pressure is applied from the inflow port and thus the sealing performance for preventing the backflow of the fluid can be secured.

Application Example 4

According to the application example, there is provided a check valve including: a duckbill valve; and a support member which is inserted into an inside portion of the duckbill valve, in which hardness of the support member is equal to or less than that of the duckbill valve.

According to the application example, even if the polymerized foreign substance adheres to the portion where contact, separation, and sliding are repeated according to liquid sending between the duckbill valve and support member, since the duckbill valve and the support member are cut by the equal amount to each other or the support member is more likely to be cut, wear and breakage of the duckbill valve can be suppressed.

Application Example 5

In the check valve according to the application example, the duckbill valve includes a slit which is provided on a side where fluid is discharged, an inflow port which is provided on a side where the fluid flows in, and a flow path which connects the inflow port to the slit, and in which the support member is inserted into the flow path from the inflow port, a hole for sending the fluid to the slit when flowing in from the inflow port is provided, and the hole is provided so as to be hermetically sealed by the duckbill valve when a negative pressure is applied from the inflow port side.

According to the application example, the sealing performance for preventing the backflow of fluid can be enhanced, and a highly reliable check valve can be provided, due to a double close contact structure being configured by a close contact portion between the duckbill valve and the hole of the support member and the slit of the duckbill valve since wear resistance of the duckbill valve is increased.

Application Example 6

In the check valve according to the application example, the duckbill valve includes a first wall surface and a second wall surface which are a pair of inclined surfaces extending so as to converge toward a tip end side having the slit, the support member has a third wall surface positioned inside the first wall surface and a fourth wall surface positioned inside the second wall surface, and the hole is provided on the third wall surface.

According to the application example, since wear resistance of the duckbill valve is increased, when the fluid flowing in from the inflow port is fed to the slit by the hole provided on the third wall surface of the support member positioned inside the first wall surface of the duckbill valve or a negative pressure is applied from the inflow port, a sealing performance for preventing the backflow of the fluid can be enhanced due to a double close contact structure by a close contact portion between the duckbill valve and the hole of the support member, and the slit and the holes.

Application Example 7

In the check valve according to the application example, a plurality of holes are provided.

According to the application example, since the contact area between the periphery of the hole of the support member and the inside of the duckbill valve can be increased, compared with a case of providing one hole having a large size being provided, the deformation of the portion which is in contact with the periphery of the hole of the duckbill valve is suppressed when the negative pressure is applied from the inflow port and thus the sealing performance for preventing the backflow of the fluid can be secured.

Application Example 8

In the check valve according to the application example, the fluid is an ultraviolet curable ink.

The inventor, or the like has found that, in a case where ultraviolet curable ink (hereinafter, referred to as "UV ink") is pumped by a pump in which a check valve according to the application example is disposed on the fluid flow path, there is a case where, in a fluid flow path, the UV ink is polymerized at a portion where contact, separation, and sliding are repeated according to sending of UV ink as a liquid and then polymerized foreign substance is generated, adheres thereto, and is accumulated thereon or the generated polymerized foreign substance is sent as a liquid, transferred by UV ink, adhered to and accumulated on another portion.

According to the application example, even in a case where UV ink is used as the fluid, the configuration of the check valve described in the application example is adopted. Accordingly, even in a case where polymerized foreign substance of UV ink is generated, adheres to, and is accumulated on a portion where contact, separation, and sliding are repeated such as the slit of the duckbill valve and a contact portion between the duckbill valve and the periphery of the hole of the support member according to sending of UV ink as a liquid, the sealing performance for preventing the backflow of UV ink can be enhanced and wear resistance of the duckbill valve can be enhanced due to a double close contact structure by a close contact portion between the duckbill valve and the hole of the support member and the slit of the duckbill valve, and thus a highly reliable check valve can be provided.

Application Example 9

In the check valve according to the application example, the support member is made of a silicon-based resin.

According to the application example, the silicon-based resin is a generic term for organic compounds including silicon, is a silicon-based rubber, and includes so-called silicone rubber. The inventors have found that a seal member made of a silicone-based resin such as silicone rubber has relatively high resistance to a fluid (for example, ultraviolet curable ink) including an organic solvent or an organic compound such as ink which is ejected from a nozzle and has a relatively wide use temperature range including a low temperature range. In addition, since the silicon-based resin is a relatively soft material, an effect that mechanical damage such as wear of the duckbill valve can be suppressed at a contact portion with the duckbill valve can be obtained.

Application Example 10

In the check valve according to the application example, the support member is made of a perfluoro type fluorine-based resin.

According to the application example, since the perfluoro type fluorine-based resin has high resistance to a fluid such as ultraviolet curable ink, in particular, or is relatively soft material, damage to the duckbill valve is suppressed, and thus a highly reliable check valve can be provided.

Application Example 11

According to the application example, there is provided a diaphragm pump including, a diaphragm pumping portion including a fluid suction and discharge chamber which is defined by an elastic diaphragm and changes volume thereof by elastic deformation of the diaphragm, an inlet flow path which is connected via a first check valve allowing only a fluid flow in a direction facing the fluid suction and discharge chamber, and an outlet flow path which is connected via a second check valve allowing only a fluid flow in a direction exiting from the fluid suction and discharge chamber, a diaphragm deformation chamber which is positioned at a side opposite to the fluid suction and discharge chamber with the diaphragm of the diaphragm pumping portion interposed between fluid suction and discharge chamber and the diaphragm deformation chamber; and a driving mechanism portion which periodically increases and decreases the pressure of the fluid suction and discharge chamber by performing the driving by deforming the diaphragm from the diaphragm deformation chamber side and changing the volume of the fluid suction and discharge chamber to be large or small, in which the second check valve is the check valve according to any one of the application examples.

According to the application example, since the check valve according to the application examples is provided on the second check valve side in which higher fluid pressure than that of the first check valve on the inlet flow path side is generated in pumping of fluid, a highly reliable diaphragm pump capable of stably pumping fluid can be provided.

Application Example 12

In the diaphragm pump according to the application example, the first check valve is the check valve according to any one of the application examples.

According to the application example, since the check valve according to the application examples is also used for the first check valve along with the second check valve, the backflow of the fluid is suppressed and thus the diaphragm pump capable of further stably pumping fluid can be provided.

Application Example 13

In the diaphragm pump according to the application example, the diaphragm pump further includes a first housing which constitutes the fluid suction and discharge chamber; and a second housing which constitutes the diaphragm deformation chamber, in which the diaphragm is interposed between the first housing and the second housing and fixed, in which the diaphragm includes a peripheral portion which is interposed between the first housing and the second housing and a deformation portion which is positioned to the center of the peripheral portion and deforms according to increase and decrease of pressure of the fluid suction and discharge chamber, and in which the first housing are formed so that the first housing and the deformation portion is not in contact with each other.

According to the application example, in a case where a UV ink is particularly used as a fluid, the effect of suppressing the generation of polymerized foreign substances of the UV ink can be obtained by contact, separation, and sliding between a UV ink (fluid), a diaphragm which is deformed according to pumping of the UV ink, and the fluid suction and discharge chamber of the first housing being not generated.

Application Example 14

In the diaphragm pump according to the application example, a side surface being continuous with a facing surface which faces the diaphragm of the first housing and an end surface of an annular protrusion portion which is formed on an outside of the facing surface of the first housing is inclined.

According to the application example, as compared with a case where a corner portion is formed by the facing surface and the side surface, bubbles are unlikely to stay at the corner portion in the fluid suction and discharge chamber. In a case where the volume of the fluid suction and discharge chamber is changed to large and small, reduction of the transporting volume of the liquid by the change in the volume being absorbed by the expansion and shrinkage of the bubbles can be avoided.

Application Example 15

According to the application example, there is provided a printing apparatus including, a fluid storage portion which can store a fluid, a fluid ejecting head which ejects fluid supplied from the fluid storage portion, a fluid supply flow path which supplies the fluid from the fluid storage portion to the fluid ejecting head, and a pump which is disposed in the fluid supply flow path and includes a fluid suction and discharge chamber, an inlet flow path connected via a first check valve allowing only fluid flowing in a direction facing the fluid suction and discharge chamber; and an outlet flow path connected via a second check valve allowing only fluid flowing in a direction exiting from the fluid suction and discharge chamber and through which the fluid flows, in which the second check valve is the check valve according to any one of the application examples.

According to the application example, in the fluid supply flow path that supplies the fluid from the liquid storage portion to the fluid ejecting head, since the check valve according to the application example is provided on the second check valve side where a higher liquid pressure is generated than the first check valve on the inlet flow path side, a stable pumping of a fluid such as a printing ink or the like becomes possible, for example. Therefore, since a stable fluid (ink) can be supplied to the fluid ejecting head, a printing apparatus performing high quality printing can be provided.

Application Example 16

In the printing apparatus according to the application example, the first check valve is the check valve according to any one of the application examples.

According to the application example, since the check valve according to the application example is also used for the first check valve along with the second check valve, the more stable supply of fluid (ink) to the fluid ejecting head becomes possible and the quality of printing can be enhanced.

Application Example 17

According to the application example, there is provided a printing apparatus including, a fluid storage portion which can store a fluid, a fluid ejecting head which ejects fluid supplied from the fluid storage portion, and the diaphragm pump according to any one of the application examples which is disposed on a fluid supply flow path which supplies the fluid to the fluid ejecting head from the fluid storage portion and through which the fluid flows.

According to the application example, since the diaphragm pump according to the application examples is provided and fluid can be stably pumped to the fluid ejecting head, a printing apparatus that can perform high-quality printing can be provided.

BRIEF DESCRIPTION OF THE DRAWINGS

Embodiments of the invention will now be described by way of example only with reference to the accompanying drawings, wherein like numbers reference like elements.

DESCRIPTION OF EXEMPLARY EMBODIMENTS

Hereinafter, with reference to the drawings, embodiments of the invention will be described. In each of the drawings illustrated below, in order to make respective layers and respective components easily recognizable on the drawings, there is a case where the dimension and ratio of the respective layers and the respective components are illustrated differently from those of the actual layers and components.

Check Valve

Figure 1:
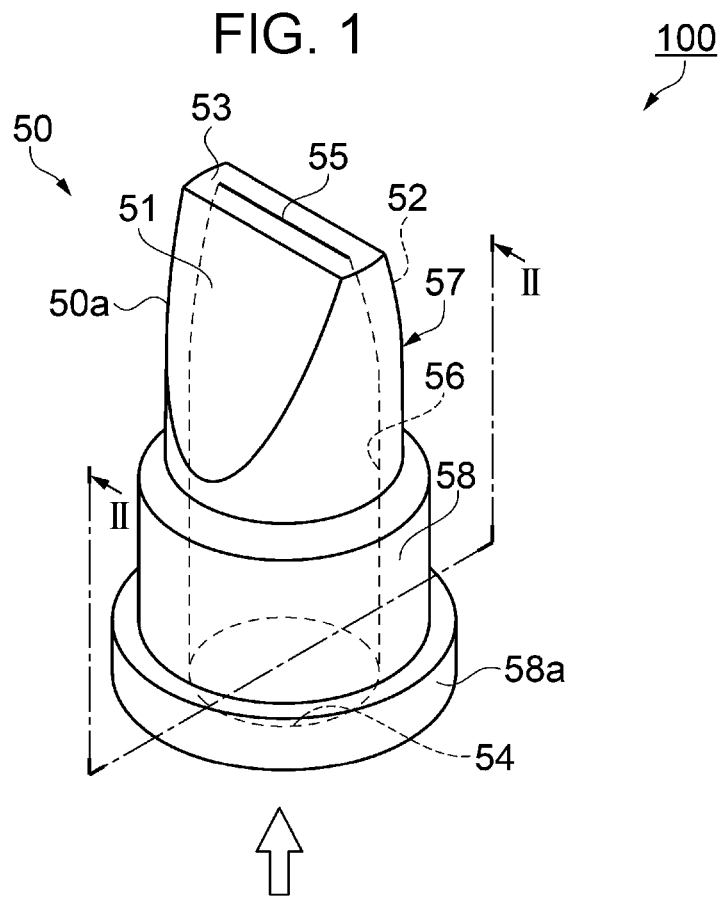
FIG. 1 is an exploded assembly view illustrating a check valve according to an embodiment.
Figure 1:
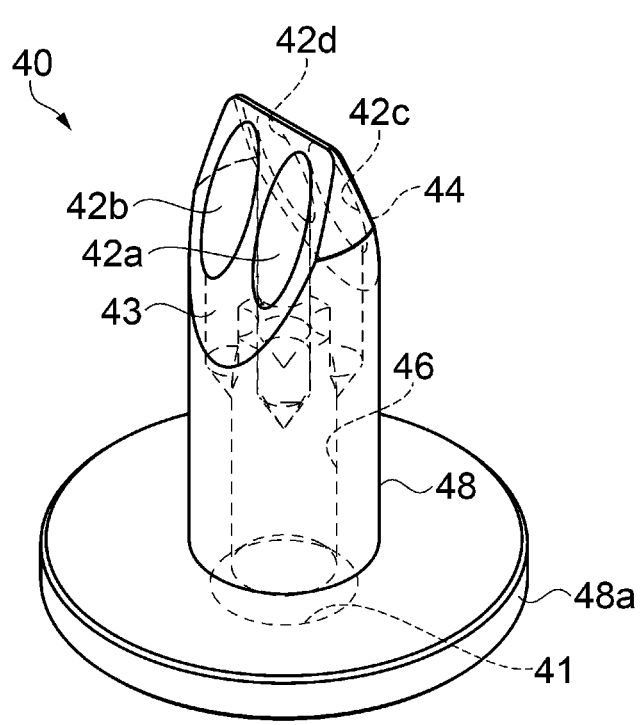
Figure 2:
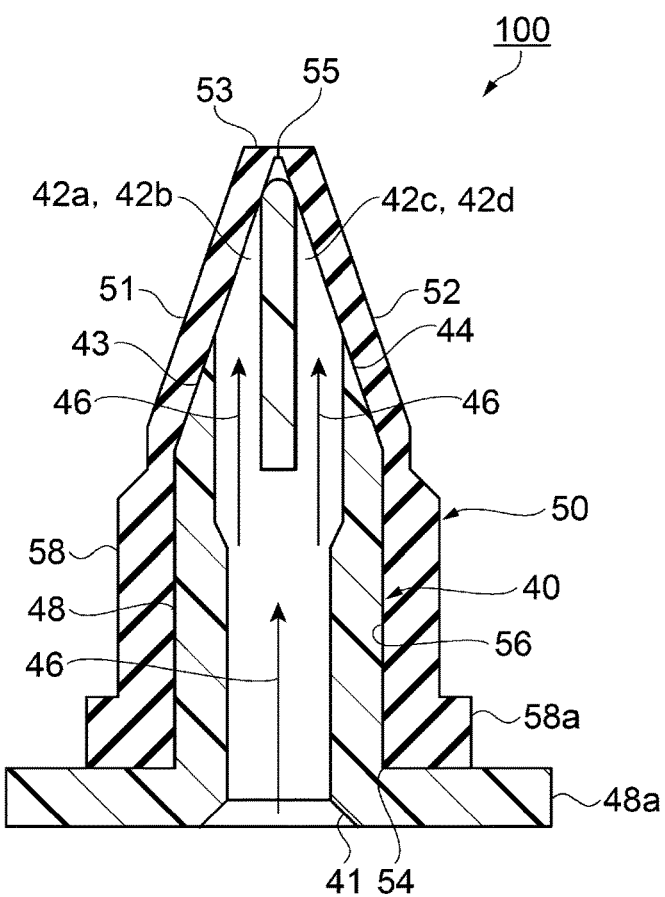
FIG. 2 is a sectional view taken along line II-II in FIG. 1 in a state where the check valve is assembled.

FIG. 1 is an exploded assembly view illustrating a check valve according to an embodiment. FIG. 2 is a sectional view taken along line II-II in FIG. 1 in a state where the check valve is assembled.

First, a schematic configuration of the check valve 100 according to the present embodiment will be described.

As illustrated in FIG. 1 and FIG. 2, the check valve 100 includes a duckbill valve 50 and a support member 40 which is inserted into an inside portion of the duckbill valve 50.

The duckbill valve 50 is made of a flexible material such as synthetic rubber and is configured by a cylindrical base portion 58 and a duckbill portion 57 which is formed in the shape of a beak of a duck having a first wall surface 51 and a second wall surface 52 which are a pair of inclined surfaces extending so as to converge from the base portion 58 toward a duckbill tip end portion 53. The duckbill tip end portion 53 on the fluid discharge side includes a slit 55 which can be opened by bending so as to allow fluid to pass therethrough and is closed so as to prevent backflow of the fluid. In addition, the duckbill valve includes an inflow port 54 which is provided on a side where the fluid flows in on a side opposite to the duckbill tip end portion 53 of the base portion 58 and a flow path 56 which connects the inflow port 54 and the slit 55. In addition, the duckbill valve originally includes an outer peripheral protrusion portion 58a functioning as a sealing ring or a sealing bead on the outer periphery of the base portion 58 on the side of the inflow port 54, when the duckbill valve 50 is directly mounted on a pump or the like.

The support member 40 has an outer shape substantially the same as the inside of the duckbill valve 50 and is inserted into the flow path 56 from the inflow port 54 of the duckbill valve 50. The support member 40 includes a cylindrical base portion 48, a third wall surface 43 which is positioned an inside of the first wall surface 51 and a fourth wall surface 44 which is positioned an inside of the second wall surface 52 from the base portion 48 of the support member 40 to a duckbill tip end portion 53 side (slit 55 side) in a state of being inserted into the inside portion of the duckbill valve 50.

A hole 42 which becomes a flow path 46 (see FIG. 2) for feeding fluid to the slit 55 when being introduced from an inner inflow port 41 of the support member 40 which is disposed on an inside of the inflow port 54 of the duckbill valve 50 is formed to be passing through the third wall surface 43 and the fourth wall surface 44, respectively. In the present embodiment, two holes 42a and 42b into which the hole 42 is branched are formed on the third wall surface 43, and two holes 42c and 42d into which the hole 42 is branched are formed on the fourth wall surface 44. The third wall surface 43 is in close contact with the inside of the first wall surface 51 of the duckbill valve 50 and the fourth wall surface 44 is in close contact with an inside of the second wall surface 52 of the duckbill valve 50. In other words, in a case where a negative pressure is applied from the inner inflow port 41 side of the support member 40 inserted inside the inflow port 54 or in a case where a positive pressure is applied from a discharge side, each of the holes 42a to 42d is provided so as to be hermetically sealed by the inside of each of the first wall surface 51 and the second wall surface 52 of the duckbill valve 50. With such a configuration, even in a case where foreign substance adheres to and accumulates on a portion where contact, separation, and sliding are repeated according to pumping of ink, such as a contact portion between the duckbill valve 50 and the periphery of the holes 42a to 42d of the support member 40, sealing performance for preventing the backflow of UV ink can be enhanced due to a double close contact structure by a close contact portion between the duckbill valve 50 and the holes 42a to 42d of the support member 40 and the slit 55 of the duckbill valve 50.

In addition, the support member 40 includes an outer peripheral protruding portion 48a functioning as a sealing ring or a sealing bead when the check valve 100 is mounted with the outer periphery of the base portion 48 on the inner inflow port 41 side such as on the pump.

In the check valve 100 having the configuration described above, the duckbill valve 50 can be formed of an elastic member such as synthetic rubber having flexibility, and the material used for the support member 40 preferably uses a material having hardness equal to or less than that of the duckbill valve 50 and more preferably uses a material having hardness less than that of the duckbill valve 50. With such a configuration, even in a case where a foreign substance or the like adheres to a portion where contact, separation, and sliding are repeated according to sending of fluid as a liquid between the duckbill valve 50 and the support member 40 during sending of the fluid as a liquid by the check valve 100 and the foreign substance is interposed between the duckbill valve 50 and the support member 40, since the hardness of the duckbill valve 50 and the support member 40 is equal to each other, or the support member 40 has a hardness less than that of the duckbill valve 50, an effect that wear and breakage of the duckbill valve 50 can be suppressed can be obtained as compared with a case where the hardness of the support member 40 is higher than that of the duckbill valve 50.

The inventor has found in particular, in a case where UV ink is used as a pumping fluid by the pump system in which the check valve 100 is disposed in the fluid flow path, there is a case the UV ink is polymerized at a portion where contact, separation, and sliding is repeated according to sending of UV ink as a liquid, UV polymerized foreign substance is generated, adheres thereto, and is accumulated thereon, the generated polymerized foreign substance is sent as a liquid, transferred by the UV ink, adheres thereto, and is accumulated on another portion in the duckbill valve 50 and the support member 40. Therefore, even in a case where, polymerized foreign substance of UV ink is generated, adhered to, and accumulated on the portion where contact, separation, and sliding is repeated according to sending of UV ink as a liquid such as the slit 55 of the duckbill valve 50 and the contact portion between the duckbill valve 50 and the periphery of the holes 42a to 42d of the support member 40, by using the UV ink as the fluid, since the sealing performance for preventing the backflow of the UV ink is enhanced due to a double sealed structure by the close contact portion between the duckbill valve 50 and the holes 42a to 42d of the support member 40 and the slit 55 of the duckbill valve 50 and wear and breakage of the duckbill valve 50 can be suppressed by the material used for the support member 40 being a material having a hardness equal to or less than that of the duckbill valve 50 or a material having a lower hardness than the material of the duckbill valve 50, the highly reliable check valve 100 can be provided.

Specifically, a silicon-based resin can be suitably used as the material of the support member 40.

The silicon-based resin is a generic term for organic compounds including silicon, is preferably a silicon-based rubber, and includes so-called silicone rubber. It is known that a seal member made of a silicone-based resin such as silicone rubber has relatively high resistance to a fluid (for example, UV ink) including an organic solvent or an organic compound such as ink which is ejected from a nozzle and has a relatively wide use temperature range including low temperatures. In addition, since the silicon-based resin is a relatively soft material, mechanical damage such as wear of the duckbill valve 50 can be suppressed at the contact portion with the duckbill valve 50.

In addition, a perfluoro type fluoro resin can be suitably used as a material of the support member 40. Since perfluoro type fluorine-based resin (perfluoroelastomer) has high resistance to fluid such as ultraviolet curable ink in particular and/or is a relatively soft material, damage to the duckbill valve 50 is suppressed and the highly reliable check valve 100 can be provided. In addition, a metal may be used as the material of the support member 40.

In addition, in the check valve in the application example described above, in order to make it difficult for the polymerized foreign substance of UV ink to accumulate on the support member 40, surface treatment which allows polymerized foreign substance accumulated on the surface of the support member 40 to be likely to be peeled off may be applied or the material of the support member 40 itself may be formed of a material that the polymerized foreign substance is likely to be peeled off. As such a surface treatment, coating using a fluorine-based resin such as polytetrafluoroethylene, silicone coat, and Raydent treatment (Raydent Industrial Co., Ltd.) are included, as examples. In addition, as a material that the polymerized foreign substance is likely to be peeled off, a liquid fluorine-based elastomer (SHIN-ETSU SIFEL) and a fluorine-based resin such as polytetrafluoroethylene are included, as examples.

As described above, the check valve 100 according to the present embodiment configured by the support member 40 being inserted into the inside portion of the duckbill valve 50 can be a check valve 100 having a high resistance to high back pressure compared to a case where the duckbill valve 50 alone is used as the check valve in the related art. The holes 42a and 42b and holes 42c and 42d provided on the third wall surface 43 and the fourth wall surface 44 of the support member 40 are provided to be sealed by the inside of the duckbill valve 50 in a case where a negative pressure is applied from inner inflow port 41 side of the inside of the inflow port 54 or in a case where a positive pressure is applied from the discharge side, and thus sealing performance for preventing the backflow of fluid is enhanced and thus a highly reliable check valve 100 can be provided due to a double sealed structure by the close contact portion between the duckbill valve 50 and the holes 42a to 42d of the support member 40 and the slit 55 of the duckbill valve 50.

In addition, in the check valve 100 according to the present embodiment, the support member 40 includes a third wall surface 43 positioned inside the first wall surface 51 of the duckbill valve 50 and a fourth wall surface 44 positioned inside the second wall surface 52 of the duckbill valve 50 and a plurality of (two in the present embodiment) holes 42a and 42b and holes 42c and 42d are provided on each of the third wall surface 43 and the fourth wall surface 44, respectively.

With the configuration, by the holes 42a and 42b provided on the third wall surface 43 of the support member 40 positioned inside the first wall surface 51 of the duckbill valve 50 and the holes 42c and 42d provided on the fourth wall surface 44 of the support member 40, positioned inside the second wall surface 52 of the duckbill valve 50, when a negative pressure is applied from the inner inflow port 41, the sealing performance for preventing the backflow of the fluid can be enhanced due to a double sealed structure by the close contact portion between the duckbill valve 50 and the respective holes 42a to 42d of the support member 40 and the slit 55 of the duckbill valve 50.

In addition, a plurality (two in the present embodiment) of holes 42*a* and 42*b* and holes 42*c* and 42*d* are provided on each of the third wall surface 43 and the fourth wall surface 44, respectively.

According to the configuration, since the contact area between the periphery of the holes 42*a* to 42*d* on each of the wall surfaces and the inside of the duckbill valve 50 can be made larger than even in a case where one large-sized hole is provided on each wall surface of the support member 40, when a negative pressure is applied from the inflow port, the deformation of the portion which is in contact with the periphery of the holes 42*a* to 42*d* of the duckbill valve 50 is suppressed, and thus the sealing performance for preventing the backflow of the fluid can be secured.

Diaphragm Pump

Figure 3:
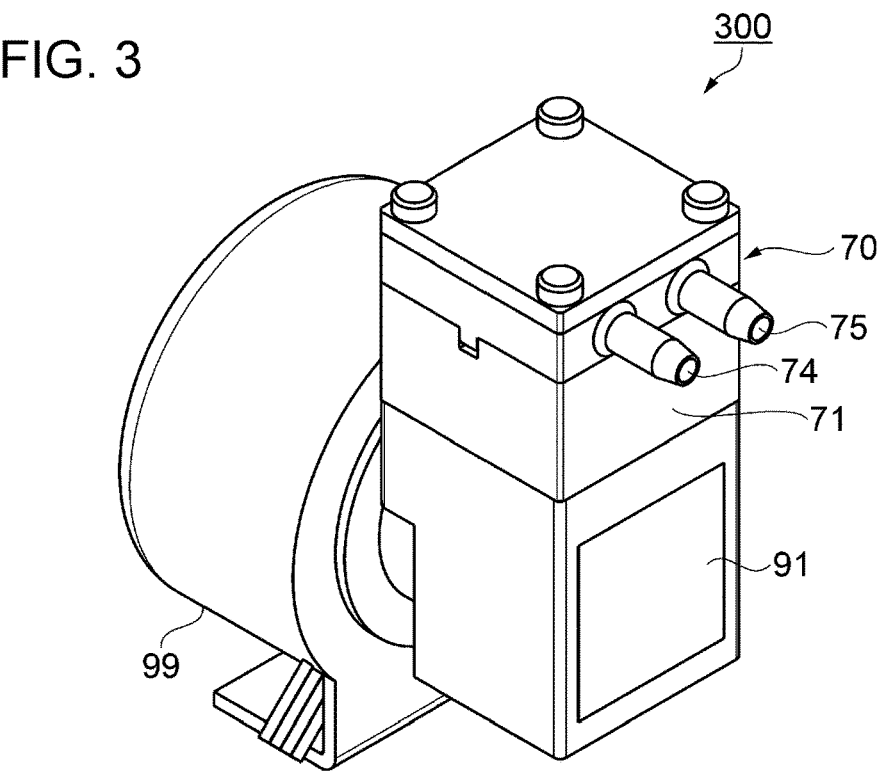
FIG. 3 is a perspective view illustrating an outer appearance of a diaphragm pump according to an embodiment.
Figure 4:
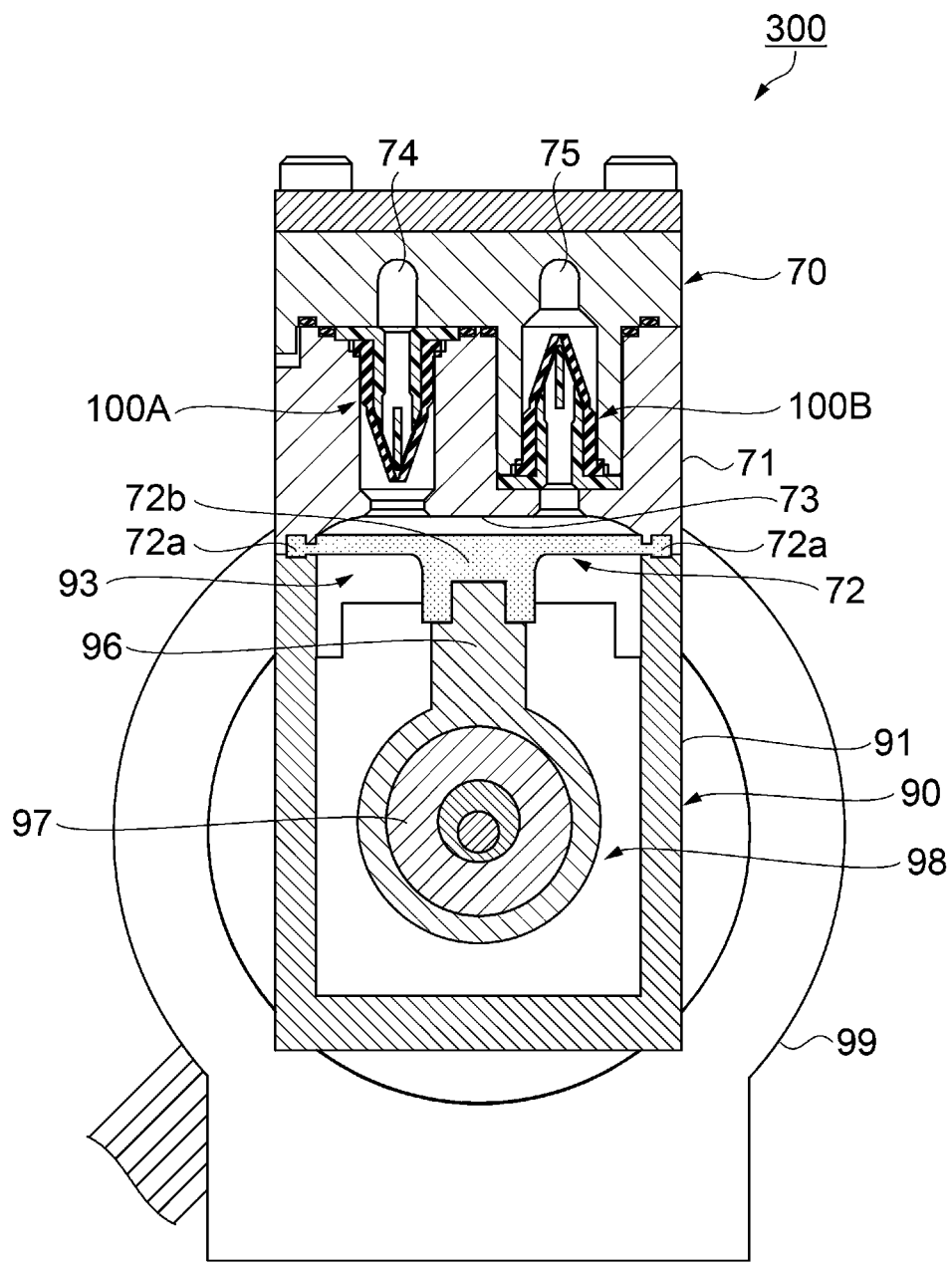
FIG. 4 is a sectional view illustrating a schematic configuration in a neutral state of a diaphragm pump.
Figure 5:
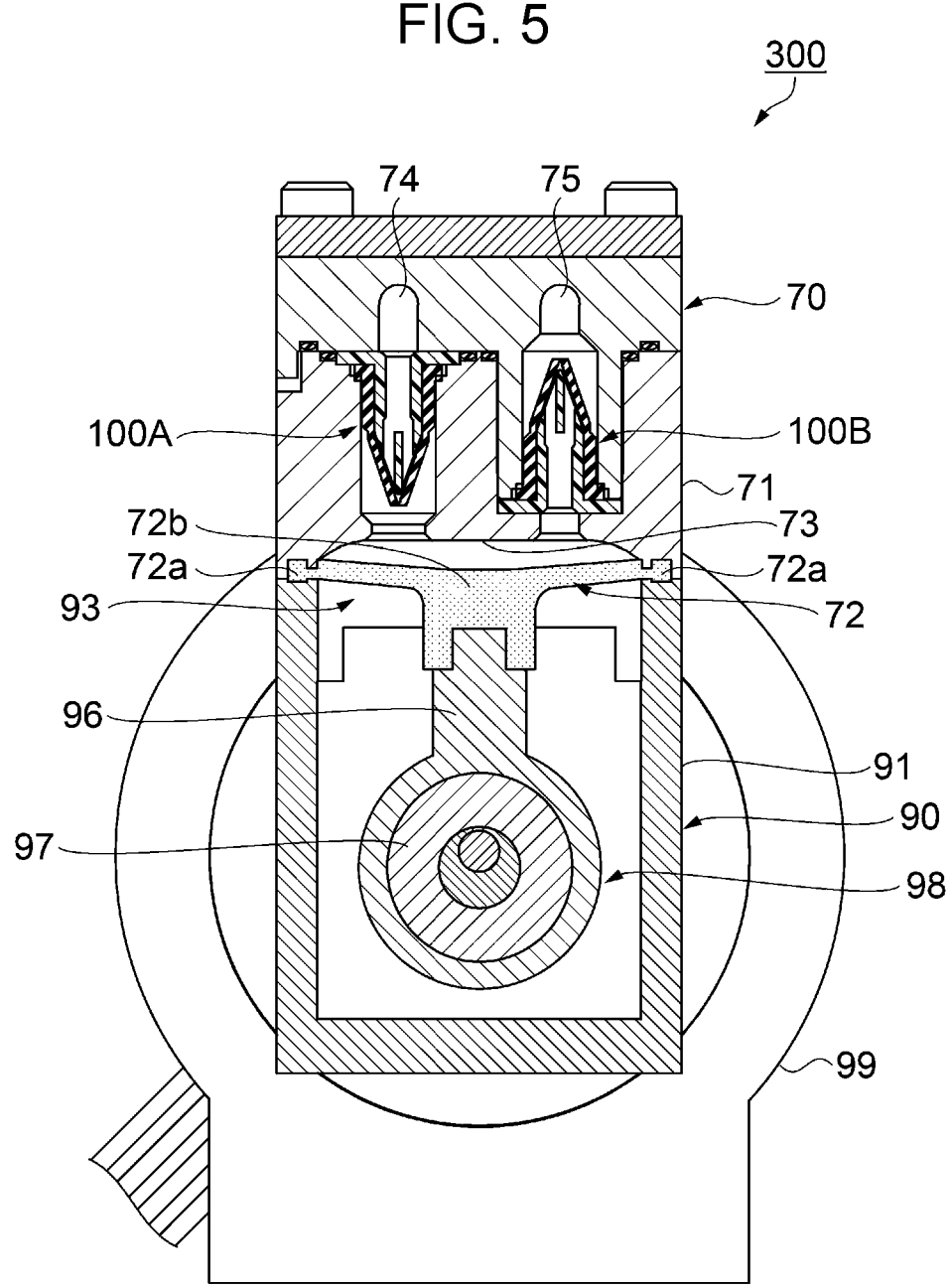
FIG. 5 is a sectional view illustrating a schematic configuration in a suction state of the diaphragm pump.
Figure 6:
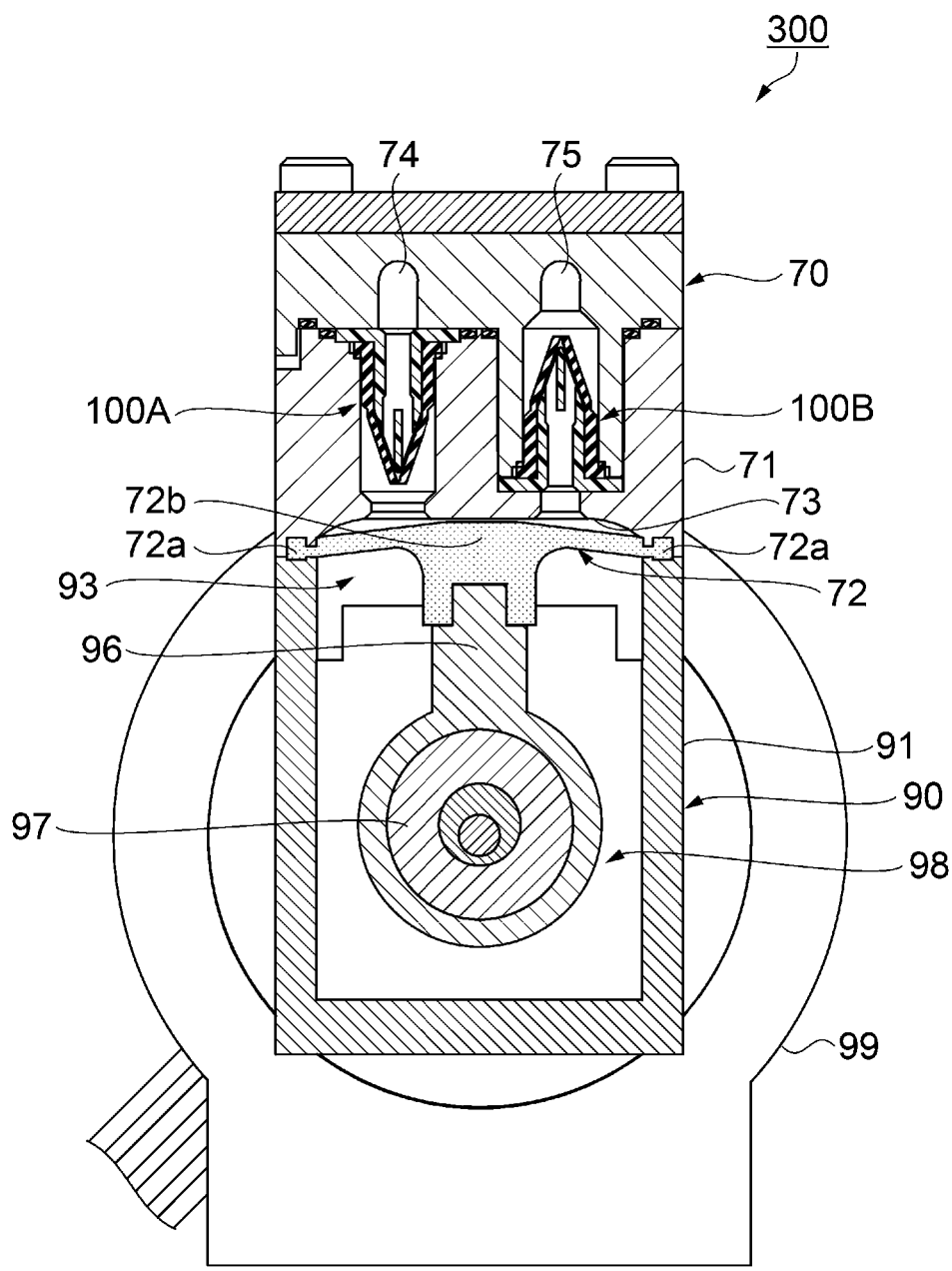
FIG. 6 is a sectional view illustrating a schematic configuration in a discharge state of the diaphragm pump.
Figure 7:
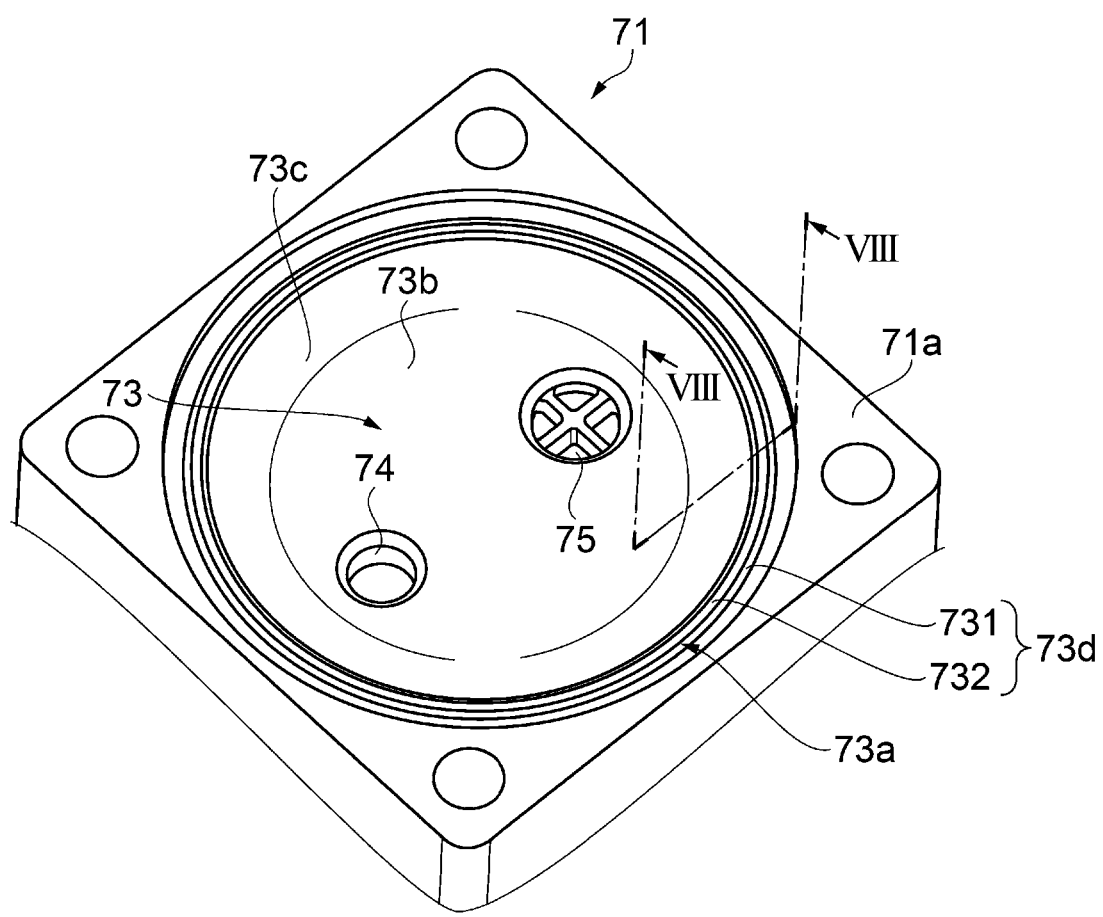
FIG. 7 is a perspective view illustrating a first housing of the diaphragm pump as viewed from a fluid suction and discharge chamber side.
Figure 8:
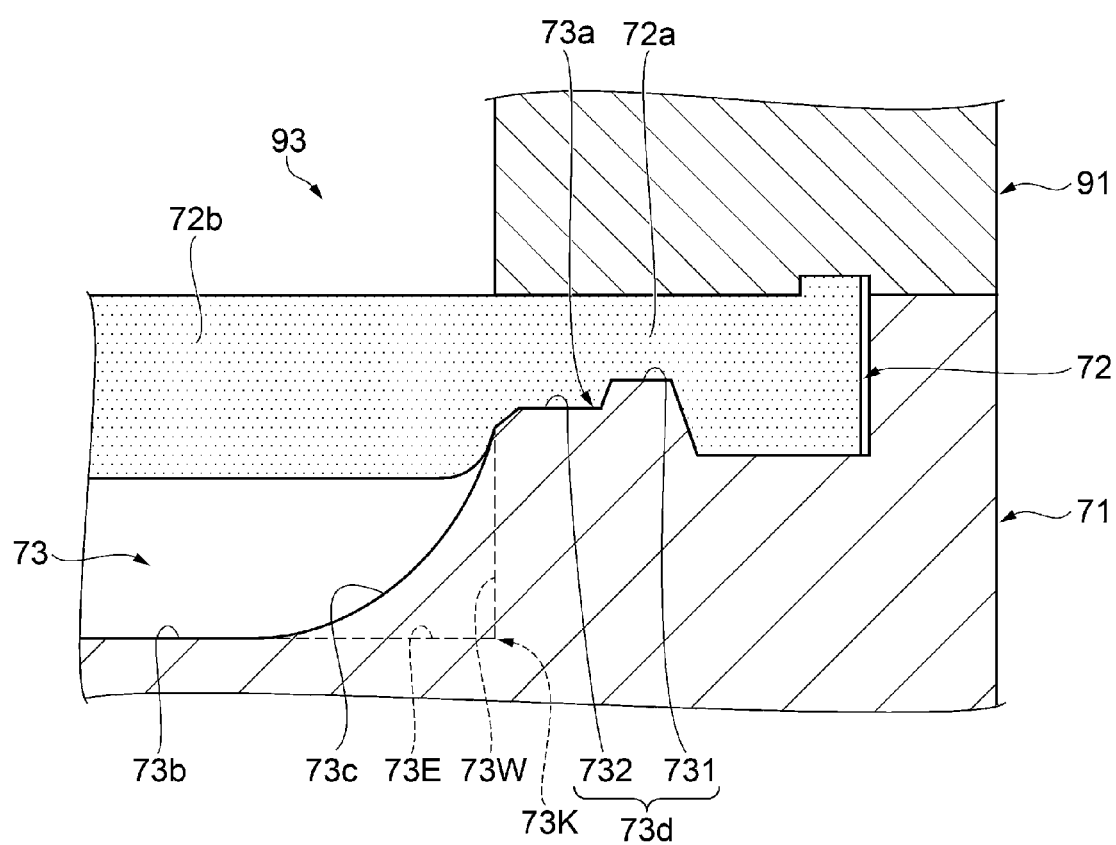
FIG. 8 is a partial sectional view taken along line VIII-VIII of the first housing illustrated in FIG. 7.

FIG. 3 is a perspective view illustrating the outer appearance of a diaphragm pump according to the present embodiment. FIG. 4 to FIG. 6 are sectional views illustrating a state transition of a schematic configuration of the diaphragm pump, FIG. 4 illustrates a neutral state of the diaphragm pump, FIG. 5 illustrates a suction state of the diaphragm pump, and FIG. 6 illustrates the discharge state of the diaphragm pump. In addition, FIG. 7 is a perspective view illustrating the first housing of the diaphragm pump as viewed from the fluid suction and discharge chamber side, and FIG. 8 is a partial sectional view taken along the line VIII-VIII of the first housing illustrated in FIG. 7.

Hereinafter, the diaphragm pump 300 of the present embodiment including the check valve described above will be described with reference to these drawings.

As illustrated in FIG. 3, the diaphragm pump 300 includes a diaphragm pumping portion 70 which has a first housing 71, a second housing 91 which includes a driving mechanism portion 90 (see FIG. 4 to FIG. 6) for causing a predetermined deformation of the diaphragm 72 of a diaphragm pumping portion 70 to be described below, and a motor 99 which is a driving source of the driving mechanism portion 90 (see FIG. 4 to FIG. 6).

An inlet flow path 74 and an outlet flow path 75 connected to the inside portion of the diaphragm pumping portion 70 protrudes to be taken out of the first housing 71, and each of the inlet flow path 74 and the outlet flow path 75 can be connected to an external fluid pipe.

In FIG. 4, the diaphragm pump 300 has a diaphragm 72 which has elasticity and a fluid suction and discharge chamber 73 which is defined on the first housing 71 side by elastic deformation of the diaphragm 72 and changing volume thereof. The fluid suction and discharge chamber 73 of the diaphragm pumping portion 70 is provided with an inlet flow path 74 which is connected via a first check valve 100A allowing only a fluid flow in a direction facing/into the fluid suction and discharge chamber 73, and an outlet flow path 75 which is connected via a second check valve 100B allowing only a fluid flow in the direction exiting from the fluid suction and discharge chamber 73. Of the first check valve 100A and the second check valve 100B, at least the second check valve 100B uses the check valve 100 described above (see FIG. 1 and FIG. 2). In the present embodiment, the check valve 100 described above is also used for the first check valve 100A along with the second check valve 100B.

The second housing 91 of the driving mechanism portion 90 has a diaphragm deformation chamber 93 which is a space allowing displacement of the diaphragm 72 to the side opposite to the fluid suction and discharge chamber 73 with the diaphragm 72 sandwiched between the diaphragm deformation chamber 93 and fluid suction and discharge chamber 73. An eccentric cam mechanism 98 using an eccentric cam 97 is provided below the diaphragm deformation chamber 93 as a driving mechanism for driving and deforming the diaphragm 72 to deform. One end of a rod 96 is connected to the eccentric cam 97 of the eccentric cam mechanism 98 and the other end of the rod 96 is connected to the diaphragm deformation chamber 93 side of the diaphragm 72.

With the configuration, when the motor 99 of the driving mechanism portion 90 is controlled to be driven and the eccentric cam mechanism 98 causes the diaphragm 72 to undergo predetermined deformation, the pressure in the fluid suction and discharge chamber 73 is periodically increased or decreased and thus the volume of the fluid suction and discharge chamber 73 can be varied to be large or small.

FIG. 4 illustrates a state in which the diaphragm 72 is in the neutral position. The neutral position of the diaphragm 72 is a position at which the volume of the fluid suction and discharge chamber 73 whose volume changes by change in the position and shape of the diaphragm 72 becomes an intermediate value between the maximum value and the minimum value.

From the setting state (neutral state) of the diaphragm pump 300 illustrated in FIG. 4, the motor 99 of the driving mechanism portion 90 is controlled to perform appropriate driving by the eccentric cam mechanism 98, and as illustrated in FIG. 5, in the descending process that the diaphragm 72 descends to the diaphragm deformation chamber 93 side, the pressure in the chamber constituted by the fluid suction and discharge chamber 73 and the diaphragm 72 descends (decreases), and in the ascending process of the diaphragm 72 as in illustrated in FIG. 6, the pressure in the chamber described above ascends (increases). Then, in the process of increasing the pressure in the fluid suction and discharge chamber 73, the diaphragm 72 deforms toward the fluid suction and discharge chamber 73 side and the volume of the fluid suction and discharge chamber 73 decreases (see FIG. 6). At this time, the discharge of the fluid via the inlet flow path 74 is blocked by the first check valve 100A, and the fluid in the fluid suction and discharge chamber 73 is discharged from the outlet flow path 75 via the second check valve 100B. On the other hand, in the pressure descending process of the fluid suction and discharge chamber 73, the diaphragm 72 is deformed toward the diaphragm deformation chamber 93 side, and the volume of the fluid suction and discharge chamber 73 increases (see FIG. 5). At this time, suction of the fluid via the outlet flow path 75 is blocked by the second check valve 100B, and the fluid is sucked into the fluid suction and discharge chamber 73 from the inlet flow path 74 via the first check valve 100A (See FIG. 5 and FIG. 6). As a result of this operation being repeated, fluid is sent as a liquid from the inlet flow path 74 to the outlet flow path 75.

As illustrated in FIG. 4 to FIG. 6, in the diaphragm pump 300 according to the present embodiment, the diaphragm 72 is interposed between the first housing 71 constituting the fluid suction and discharge chamber 73 and the second housing 91 constituting the driving mechanism portion 90 and fixed thereto, the diaphragm 72 has a peripheral portion 72*a* which is interposed between the first housing 71 and the second housing 91 and a deformation portion 72*b* which is positioned to the center to the peripheral portion 72*a* and deforms according to increase and decrease of the pressure of the fluid suction and discharge chamber 73, and the first housing 71 is formed so that the first housing 71 and the deformation portion 72*b* are not in contact with each other. In the first housing 71 according to the present embodiment, a recessed portion having a circular arc shape is formed so as to be spaced apart from the diaphragm 72 from a peripheral side to the center thereof.

According to the configuration, in a case where the UV ink, in particular, is used as the fluid to be pumped by the diaphragm pump 300, since contact, separation, and sliding between the diaphragm 72 that is deformed according to pumping of UV ink and the fluid suction and discharge chamber 73 of the first housing 71 is not generated, the generation of polymerized foreign substance of the UV ink is suppressed and thus stable liquid sending can be performed.

FIG. 7 is a perspective view illustrating the first housing 71 of the diaphragm pump 300 as viewed from the fluid suction and discharge chamber 73 side and FIG. 8 is a partial sectional view taken along the line VIII-VIII of the first housing 71 illustrated in FIG. 7. As illustrated in FIG. 7 and FIG. 8, the first housing 71 includes a facing surface 73b which faces the diaphragm 72, an annular protrusion portion 73a which is continuous with the facing surface 73b and is formed on a position facing to the peripheral portion 72a of the diaphragm 72, and a side surface (continuous surface) which connects the end surface 73d of the annular protrusion portion 73a which is in contact with the peripheral portion 72a of the diaphragm 72 and the facing surface 73b, that is, a side surface 73c which connects the end surface 73d of the annular protrusion portion 73a and the facing surface 73b, and the side surface 73c has an inclination. Specifically, as illustrated in FIG. 7 and FIG. 8, the side surface 73c which is continuous with the facing surface 73b of the first housing 71 that faces the diaphragm 72 and the end surface 73d of the annular protrusion portion 73a that is in contact with the peripheral portion 72a of the diaphragm 72 of the first housing 71 have an inclination such that the angle formed by the facing surface 73b and the side surface 73c is greater than 90 degrees. In addition, the side surface 73c may be formed as a curved surface.

In FIG. 8, in a case where an imaginary corner portion 73K (angle of 90 degrees or less) is formed by an imaginary facing surface 73E illustrated by a broken line and an imaginary side surface 73W continuous with the facing surface 73E, there is a fear that bubbles tend to stay in the imaginary corner portion 73K. Regarding to this, like the first housing 71 of the present embodiment, since the side surface 73C has an inclination and thus bubbles are unlikely to remain, the fluid can be stably pumped.

Further, in the present embodiment, the end surface 73d of the annular protrusion portion 73a formed on the peripheral edge of the first housing 71 includes a first end surface 731 formed on the peripheral edge side of the first housing 71 and a second end surface 732 whose height is less than that of the first end surface 731. In other words, the annular protrusion portion 73a has a stepped shape having a first end surface 731 and a second end surface 732 less than the first end surface 731.

With the configuration, the deformation portion 72b of the diaphragm 72 can be prevented from being in contact with the facing surface 73b of the first housing 71 during the vertical movement of the diaphragm 72 by the first end surface 731 of the annular protrusion portion 73a and the effect thereof can be further enhanced by the second end surface 732 of the annular protrusion portion 73a.

According to the diaphragm pump 300 of the present embodiment, since the check valve 100 described above is used, at least on the second check valve 100B side in which a higher liquid pressure than the first check valve 100A on the inlet flow path 74 side is generated, the highly reliable diaphragm pump 300 capable of stably pumping fluid can be provided.

Furthermore, in the present embodiment, since the check valve 100 described above is also used for the first check valve 100A, a diaphragm pump 300 capable of more stably pumping fluid can be provided.

Printing Apparatus

Figure 9:
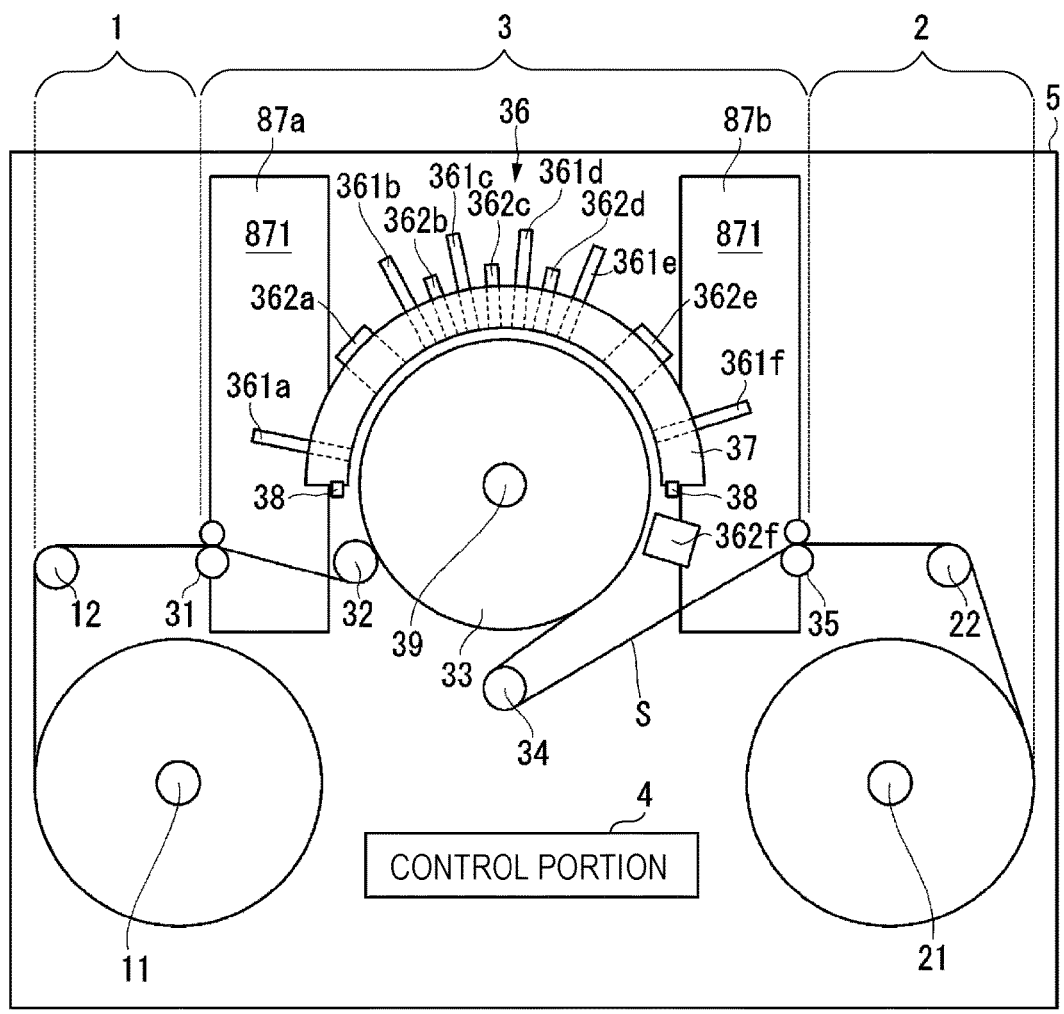
FIG. 9 is a schematic configuration view of a printing apparatus according to one embodiment of the invention.
Figure 10:
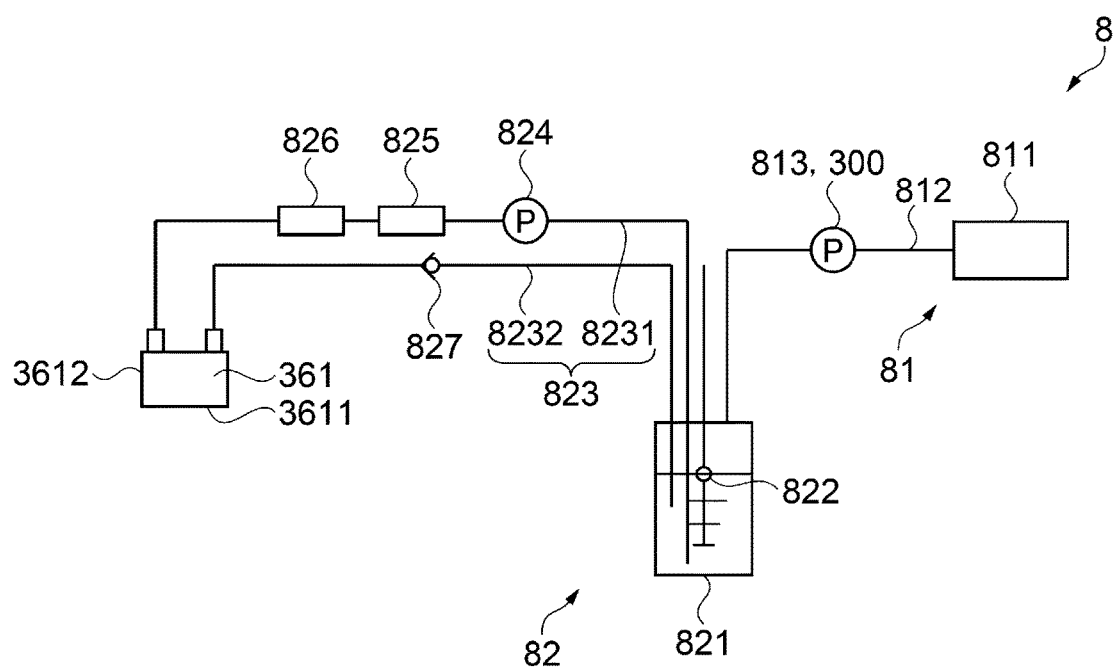
FIG. 10 is a configuration view mainly illustrating an ink supply system of the printing apparatus illustrated in FIG. 9.

FIG. 9 is a schematic configuration view of a printing apparatus according to an embodiment of the invention. In addition, FIG. 10 is a configuration view mainly illustrating the ink supply system of the printing apparatus illustrated in FIG. 9.

Hereinafter, a printing apparatus A including the diaphragm pump 300 having the check valve 100 described above will be described with reference to the drawings. In the following drawings, an XYZ orthogonal coordinate system is illustrated in order to clarify the disposition relationship of each portion of the apparatus, as necessary.

First, with reference to FIG. 9, the overall configuration of the printing apparatus A will be described. The printing apparatus A performs printing by ejecting ultraviolet curable ink (hereinafter referred to as "UV ink") as a fluid to the set printing medium S. The printing medium S is a band-shaped continuous paper. The material of the printing medium S is not particularly limited, and various types such as paper type and film type can be used.

The printing apparatus A includes a feeding portion 1, a winding portion 2, a printing portion 3, a control portion 4, and an exterior housing 5. In addition, although not illustrated in FIG. 9, the printing apparatus A includes an ink supply system 8 (see FIG. 10).

The feeding portion 1 and the winding portion 2 feed the printing medium S in a roll-to-roll manner with the printing portion 3 interposed between the feeding portion and the winding portion. The feeding portion 1 includes a feeding shaft 11 and a feeding side guide roller 12.

On the feeding shaft 11, a printing medium S wound in a roll shape is set. The printing medium S fed from the feeding shaft 11 is sent to the printing portion 3 via the feeding side guide roller 12. The winding portion 2 includes a winding shaft 21 and a winding side guide roller 22. On the winding shaft 21, the printing medium S sent from the printing portion 3 via the winding side guide roller 22 is wound up.

The printing portion 3 prints an image on the printing medium S. The printing portion 3 includes an upstream-side feed roller pair 31, an upstream-side guide roller 32, a rotary drum 33, a downstream-side guide roller 34, a downstream-side feed roller pair 35, a process unit 36, a carriage 37, and a guide rail 38.

The upstream-side feed roller pair 31 sends the printing medium S fed from the feeding portion 1 toward the upstream-side guide roller 32. The upstream-side guide roller 32 guides the feeding of the printing medium S such that the printing medium S is folded back between the upstream-side feed roller pair 31 and the rotary drum 33. The rotary drum 33 is a cylindrical drum rotatable about a rotary shaft 39 extending in the Y direction. When the printing medium S is fed along the circumferential surface of the rotary drum 33, the rotary drum 33 follows and rotates by the frictional force between the circumferential surface and the printing medium S. The rotary drum 33 functions as a platen for the liquid ejecting head 361 as a fluid ejecting head to be described below. The downstream-side guide roller 34 guides the feeding of the printing medium S such that the printing medium S is folded back between the rotary drum 33 and the downstream-side feed roller pair 35. The downstream-side feed roller pair 35 sends the printing medium S sent from the downstream-side guide roller 34 toward the winding portion 2.

The process unit 36 includes six ink ejecting heads 361a to 361f and six UV irradiators 362a to 362f. Of course, these numbers are merely examples, and the number to be described below is also merely examples.

In a case where it is not unnecessary to distinguish the six ink ejecting heads 361a to 361f, they are referred to as "ink ejecting head 361". Similarly, in a case where it is not unnecessary to distinguish the six UV irradiators 362a to 362f, they are referred to as "UV irradiator 362".

The carriage 37 mounts the ink ejecting heads 361a to 361f and the UV irradiators 362a to 362e in the process unit 36. The UV irradiator 362f is not mounted on the carriage 37. The carriage 37 and the process unit 36 mounted on the carriage 37 can reciprocate in the Y direction as will be described below. Guide rails 38 are provided at both end positions of the carriage 37 in the X direction, respectively. The guide rail 38 supports the carriage 37 so as to be slidable in the Y direction.

The six ink ejecting heads 361 are arranged in parallel along the feed path of the printing medium S so as to face the circumferential surface of the rotary drum 33. The six ink ejecting heads 361 correspond to six colors of UV inks, for example, white, yellow, cyan, magenta, black, and clear (transparent) in order from the upstream feeding side of the printing medium S. Each ink ejecting head 361 ejects UV ink by an ink jet method. The ink ejecting head 361 ejects UV ink to the printing medium S supported on the circumferential surface of the rotary drum 33. Accordingly, a color image is formed on the printing medium S. The back pressure (hereinafter, referred to as "head back pressure") of the UV ink in an inside portion of the ink ejecting head 361 is preferably maintained in the range of, for example, −3 kPa or more to −0.4 kPa or less so that a good meniscus is formed.

The ink ejecting head 361a that ejects white UV ink is used to form a white background on the printing medium S in a case of printing an image on the transparent printing medium S. An ink ejecting head 361b for ejecting yellow UV ink, an ink ejecting head 361c for ejecting cyan UV ink, an ink ejecting head 361d for ejecting magenta UV ink, and an ink ejecting head 361e for ejecting black UV ink, is used to form a color image directly on the printing medium S or over a white background formed by white UV ink. The ink ejecting head 361f that ejects clear UV ink is used to cover a color image with clear UV ink.

The six UV irradiators 362 are those for temporary curing and those for main curing. The UV irradiators 362b to 362d are for temporary curing. The UV irradiator 362b is provided between the ink ejecting head 361b and the ink ejecting head 361c, the UV irradiator 362c is provided between the ink ejecting head 361c and the ink ejecting head 361d, and the UV irradiator 362d is provided between the ink ejecting head 361d and the ink ejecting head 361e. The temporary curing UV irradiators 362b to 362d irradiate ultraviolet rays to the printing medium S from which the UV ink has been ejected with an accumulated light amount such that wet spreading of UV ink is delayed. Accordingly, generation of color mixing due to mixing of UV inks ejected from the respective ink ejecting heads 361b to 361e is suppressed.

On the other hand, the UV irradiators 362a, 362e and 362f are for the main curing. The UV irradiator 362a is provided between the ink ejecting head 361a and the ink ejecting head 361b, and the UV irradiator 362e is provided between the ink ejecting head 361e and the ink ejecting head 361f, and the UV irradiator 362f is provided on the feeding downstream side with respect to the ink ejecting head 361f. The main curing UV irradiator 362 irradiates ultraviolet ray to the printing medium S to which the UV ink is ejected with an accumulated light amount such that wet spreading of UV ink stops. Accordingly, the UV ink that is landed on the printing medium S is completely cured and fixed on the printing medium S.

In the carriage 37, two ink supply units 87a to 87b are provided in parallel in the X direction. In a case where there is no need to distinguish between the two ink supply units 87a to 87b, they are referred to as "ink supply unit 87". Each of the ink supply units 87 includes three ink supply portions 82 (see FIG. 10) and a housing portion 871 that accommodates the three ink supply portions. Three ink supply portions 82 provided on the −X side ink supply unit 87a supply the UV ink of each color to the ink ejecting heads 361a to 361c. Three ink supply portions 82 provided on the +X side ink supply unit 87b supply the UV ink of each color to the ink ejecting heads 361d to 361f. The ink supply portion 82 constitutes an ink supply system 8 (see FIG. 10) to be described below.

The control portion 4 includes a central processing unit (CPU) and various memories.

The control portion 4 controls each unit of the printing apparatus A. The exterior housing 5 accommodates the feeding portion 1, the winding portion 2, the printing portion 3, the control portion 4, and the ink supply system 8.

Subsequently, with reference to FIG. 10, the ink supply system 8 will be described. As described above, the printing apparatus A is provided with six ink ejecting heads 361 and six ink supply portions 82, but since these are configured similarly between six pieces, in FIG. 10, one ink ejecting head 361 and one ink supply portion 82 are illustrated.

The ink supply system 8 includes an ink replenishment portion 81 and an ink supply portion 82.

In the ink supply system 8, an ink supply flow path (fluid supply flow path) for supplying UV ink from a cartridge mounting portion 811 as a fluid storage portion to the ink ejecting head 361 is configured by including a replenishment flow path 812 which connects the cartridge mounting portion 811 and a sub tank 821 of the ink replenishment portion 81 to each other and a circulation forward path 8231 of the ink supply portion 82 that connects the sub tank 821 and the ink ejecting head 361 to each other.

The ink replenishment portion 81, which is a portion of the ink supply flow path, replenishes UV ink to the ink supply portion 82. The ink replenishment portion 81 includes the cartridge mounting portion 811, the replenishment flow path 812, and a replenishment pump 813. In the replenishment pump 813, the check valve 100 described above (the first check valve 100A and the second check valve 100B) and the diaphragm pump 300 having the check valve are used.

An ink cartridge (not illustrated) is mounted on the cartridge mounting portion 811. UV ink is supplied to the ink ejecting head 361 from the ink cartridge mounted on the cartridge mounting portion 811 via the sub tank 821 of the ink supply portion 82. The cartridge mounting portion 811 is connected to the sub tank 821 via the replenishment flow path 812. The replenishment pump 813 is provided in the replenishment flow path 812. The replenishment pump 813 sends the UV ink stored in the ink cartridge to the sub tank 821 via the replenishment flow path 812.

The ink supply portion 82 supplies the UV ink replenished from the ink replenishment portion 81 to the ink ejecting head 361. The ink supply portion 82 includes the sub tank 821, a liquid level sensor 822, an ink circulation flow path 823, a circulation pump 824, a heat exchanger 825, a degassing module 826, and a check valve 827.

The sub tank 821 temporarily stores the UV ink sent as a liquid from the ink cartridge. The sub tank 821 is an open type sub tank.

The liquid level sensor 822 detects the liquid level of the UV ink in the sub tank 821. The control portion 4 controls the replenishment pump 813 based on the detection result of the liquid level sensor 822.

Accordingly, the liquid level in the sub tank 821 is maintained within a predetermined range. In other words, the water head difference between the liquid surface of the sub tank 821 and the nozzle surface 3611 of the ink ejecting head 361 is maintained within a predetermined range (for example, about 200 mm). At the time of printing operation, since pressure loss of UV ink is generated by the UV ink circulating through the ink circulation flow path 823, the head back pressure is maintained at, for example, −1 kPa, and as a result, a good meniscus is formed on the nozzle of the ink ejecting head 361.

The ink circulation flow path 823 is a flow path of UV ink flowing from and returning to the sub tank 821 through the ink ejecting head 361. The ink circulation flow path 823 includes the circulation forward path 8231 and a circulation return path 8232.

UV ink supplied from the sub tank 821 to the ink ejecting head 361 flows in the circulation forward path 8231. An upstream end of the circulation forward path 8231 is inserted into the sub tank 821. A downstream end of the circulation forward path 8231 is connected to the ink ejecting head 361. In the circulation forward path 8231, the circulation pump 824, the heat exchanger 825, and the degassing module 826 are provided in this order from the upstream side.

In the circulation return path 8232, UV ink returning from the ink ejecting head 361 to the sub tank 821 flows. In other words, of the UV ink supplied from the sub tank 821 to the ink ejecting head 361 via the circulation forward path 8231, the UV ink which is not ejected from the ink ejecting head 361 returns to the sub tank 821 via the circulation return path 8232. An upstream end of the circulation return path 8232 is connected to the ink ejecting head 361. A downstream end of the circulation return path 8232 is inserted into the sub tank 821.

The circulation pump 824 sends the UV ink stored in the sub tank 821 toward the ink ejecting head 361 side. The rotation speed of the circulation pump 824 is variable between a normal speed which is a rotation speed at the time of printing operation and a high speed which is a rotation speed at the time of ejection cleaning.

As the circulation pump 824, pulsation can be suppressed, and since fluctuation in flow rate with time is small, a gear pump can be suitably used.

The UV ink flowing through the ink circulation flow path 823 is heated to a predetermined temperature (for example, 35° C. to 40° C.) by the heat exchanger 825 performing heat exchange between hot water supplied from a hot water tank (not illustrated) and the UV ink flowing through the ink circulation flow path 823. The predetermined temperature is a temperature at which the UV ink supplied to the ink ejecting head 361 has a viscosity suitable for ejection from the ink ejecting head 361. Upon start-up of the printing apparatus A, the printing apparatus A heats the UV ink having a temperature less than a predetermined temperature to a predetermined temperature by the heat exchanger 825, and then starts a printing operation.

The degassing module 826 degasses the UV ink flowing through the ink circulation flow path 823. As a result, UV ink including bubbles is prevented from being supplied to the ink ejecting head 361. As the degassing module 826, for example, a degassing module having a plurality of hollow fiber membranes can be used.

The check valve 827 is provided in the circulation return path 8232. The check valve 827 suppresses the UV ink from flowing from the sub tank 821 to the ink ejecting head 361 in the circulation return path 8232.

As described above, the printing apparatus A of the present embodiment includes the ink ejecting head 361 that ejects UV ink, the sub tank 821 that stores UV ink to be supplied to the ink ejecting head 361, the ink circulation flow path 823 which includes the circulation forward path 8231 and the circulation return path 8232, and the circulation pump 824 for circulating the UV ink in the ink circulation flow path 823.

As described above, in the printing apparatus A of the present embodiment performing printing using UV ink as a fluid, the diaphragm pump 300 having the check valve 100 described above (first check valve 100A and second check valve 100B) is disposed as the replenishment pump 813 that pumps (circulates) UV ink to the ink replenishment portion 81 connecting the ink cartridge mounted on the cartridge mounting portion 811 and the sub tank 821 to each other in the ink supply flow path.

According to the configuration, in a case where the ink replenishment portion 81 is a portion of the ink supply flow path of the UV ink, there can be a problem that UV ink is polymerized and the polymerized foreign substance is generated, adheres to, and accumulates on the portion where contact, separation, and sliding is repeated. In addition, the generated polymerized foreign substance is sent as a liquid, transferred by the UV ink and adheres to, or accumulates on another portion. In the present invention, since the sealing performance for preventing the backflow of the UV ink is enhanced due to a double sealed structure by the close contact portion between the duckbill valve 50 and the holes 42a to 42d of the support member 40 and the slit 55 of the duckbill valve 50, and since wear and breakage of the duckbill valve 50 can be suppressed by the material used for the support member 40 being a material having a hardness equal to or less than that of the duckbill valve 50 or a material having a lower hardness than the material of the duckbill valve 50, the highly reliable check valve 100 (100A and 100B) can be provided.

In addition, in the first housing 71, by the configuration in which the diaphragm 72 deformed according to pumping of UV ink and the fluid suction and discharge chamber 73 of the first housing 71 are not in contact with, are separated from, and do not slide on each other, generation of UV ink polymerized foreign substance is suppressed.

Further, the side surface 73c which is continuous with the facing surface 73b of the first housing 71 that faces the diaphragm 72 and the end surface 73d of the annular protrusion portion 73a that is in contact with the peripheral portion 72a of the diaphragm 72 of the first housing 71 have an inclination such that the angle formed by the facing surface 73b and the side surface 73c is greater than 90 degrees (R is formed). Accordingly, bubbles are less likely to stay in the fluid suction and discharge chamber 73.

With the effect described above, UV ink can be supplied to the ink ejecting head 361 in a stable state and a printing apparatus A that can perform high-quality printing can be provided.

Although the embodiment of the printing apparatus using the check valve, the diaphragm pump having the check valve, and the printing apparatus being the diaphragm pump described above has been described in detail, those skilled in the art will readily understand that many modifications are possible without deviating practically from the scope of the invention as defined by the claims. Accordingly, all such modifications are included in the scope of the invention.

For example, in the specification or the drawings, at least once, a term described together with a different term that is broader or equivalent can be replaced with the different term at any place in the specification or the drawings. In addition, the configurations and operations of the check valve, the diaphragm pump, the printing apparatus, and the like are not limited to those described in the present embodiment, and various modifications can be made.

Specifically, for example, the ink used in the printing apparatus A is not limited to the UV ink, and may be an aqueous ink, an oil-based ink, a solvent ink, a sublimation-type ink, or the like.

In addition, in the above embodiment, two holes 42a and 42b and holes 42c and 42d are provided for each of the third wall surface 43 and the fourth wall surface 44 of the support member 40. The invention is not limited thereto and one hole may be provided on each wall surface, or three or more holes may be provided.

In addition, a configuration may be adopted in which a hole is provided only in one of the third wall surface 43 and the fourth wall surface 44.

In addition, in the embodiment described above, the configuration is described in which the check valve 100 described according to FIG. 1 and FIG. 2 is applied to both the first check valve 100A and the second check valve 100B of the diaphragm pump 300. The invention is not limited to this and even in a case where the check valve 100 is applied only to the second check valve 100B side in which higher liquid pressure than the first check valve 100A on the inlet flow path 74 side is generated in pumping of fluid, a predetermined effect can be obtained.

In addition, in the above embodiment, the configuration in which the first housing 71 of the diaphragm pump 300 is inclined in a circular arc shape in cross section is described. The invention is not limited to this, and the inclined surface of the side surface 73c may have a planar shape or a stepped cross section instead of a circular arc cross section.

This application claims priority under 35 U.S.C. § 119 to Japanese Patent Application No. 2016-162493, filed Aug. 23, 2016. The entire disclosure of Japanese Patent Application No. 2016-162493 is hereby incorporated herein by reference.

What is claimed is:

1. A check valve comprising:
a duckbill valve, the duckbill valve comprising a first wall surface and a second wall surface which are a pair of inclined surfaces extending so as to converge toward a tip end side having the slit; and
a support member which is inserted into an inside portion of the duckbill valve, the support member includes a third wall surface positioned inside the first wall surface and a fourth wall surface positioned inside the second wall surface;
wherein:
hardness of the support member is equal to or less than that of the duckbill valve, such that the support member protects the duckbill valve by being worn out first,
the third wall surface and the fourth wall surface extending toward a hermetically sealed tip edge, and
a hole for providing liquid toward the sealed tip edge is provided on the third wall surface and does not extend to the fourth wall surface, such that the hole is hermetically sealed by double close contact structure when a negative pressure is applied from the inflow port side.

2. The check valve according to claim 1, wherein a plurality of holes are provided.

3. The check valve according to claim 1, wherein the support member is made of a silicon-based resin.

4. The check valve according to claim 1, wherein the support member is made of a perfluoro type fluorine-based resin.

5. A diaphragm pump comprising:
a diaphragm pumping portion including a fluid suction and discharge chamber which is defined by an elastic diaphragm and is configured to change volume by elastic deformation of the diaphragm, an inlet flow path which is connected via a first check valve allowing only a fluid flow in a direction facing the fluid suction and discharge chamber, and an outlet flow path which is connected via a second check valve allowing only a fluid flow in a direction exiting from the fluid suction and discharge chamber;
a diaphragm deformation chamber which is positioned at a side opposite to the fluid suction and discharge chamber with the diaphragm of the diaphragm pumping portion interposed between fluid suction and discharge chamber and the diaphragm deformation chamber; and
a driving mechanism portion configured to periodically increase and decrease the pressure of the fluid suction and discharge chamber by performing driving by deforming the diaphragm from the diaphragm deformation chamber side and changing the volume of the suction and discharge chamber to be large or small,
wherein the second check valve is the check valve according to claim 1.

6. The diaphragm pump according to claim 5, wherein the first check valve is the check valve according to claim 1.

7. The diaphragm pump according to claim 5, further comprising:
a first housing which constitutes the fluid suction and discharge chamber; and
a second housing which constitutes the diaphragm deformation chamber,
wherein the diaphragm is interposed between the first housing and the second housing and fixed,
wherein the diaphragm includes a peripheral portion which is interposed between the first housing and the second housing and a deformation portion which is positioned to the center of the peripheral portion and is configured to deform according to increase and decrease of pressure of the fluid suction and discharge chamber, and
wherein the first housing is formed so that the first housing and the deformation portion are not in contact with each other.

8. The diaphragm pump according to claim 7, wherein:
the first housing includes an annular protrusion portion, a facing surface and a side surface,
the facing surface faces the diaphragm;

the annular protrusion portion is outside of the facing surface;

the side surface is inclined to connect both the facing surface and an end surface of the annular protrusion portion.

9. A printing apparatus comprising:

a fluid storage portion which can store a fluid;

a fluid ejecting head configured to eject fluid supplied from the fluid storage portion; and the diaphragm pump according to claim 5 which is disposed on a fluid supply flow path configured to supply the fluid to the fluid ejecting head from the fluid storage portion and through which the fluid flows.

10. The printing apparatus according to claim 9, wherein the fluid is an ultraviolet curable ink.

11. A printing apparatus comprising:

a fluid storage portion which can store a fluid;

a fluid ejecting head is configured to eject fluid supplied from the fluid storage portion;

a fluid supply flow path is configured to supply the fluid from the fluid storage portion to the fluid ejecting head; and a pump which is disposed in the fluid supply flow path and includes a fluid suction and discharge chamber, an inlet flow path connected via a first check valve allowing only fluid flowing in a direction facing the fluid suction and discharge chamber, and an outlet flow path connected via a second check valve allowing only fluid flowing in a direction exiting from the fluid suction and discharge chamber and through which the fluid flows, wherein the second check valve is a check valve according to claim 1.

12. The printing apparatus according to claim 11, wherein the fluid is an ultraviolet curable ink.

13. The printing apparatus according to claim 11, wherein the first check valve is a check valve according to claim 1.

14. A check valve comprising:

a duckbill valve; and a support member which is inserted into an inside portion of the duckbill valve, wherein the duckbill valve includes a slit which is provided on a side where fluid is discharged, an inflow port which is provided on a side where the fluid flows in, and a flow path which connects the inflow port to the slit, and wherein the support member is inserted into the flow path from the inflow port, a hole for sending the fluid to the slit when flowing in from the inflow port is provided, and the hole is provided so as to be hermetically sealed by the duckbill valve when a negative pressure is applied from the inflow port side, wherein the duckbill valve includes a first wall surface and a second wall surface which are a pair of inclined surfaces extending so as to converge toward a tip end side having the slit, and wherein the support member has a third wall surface positioned inside the first wall surface and a fourth wall surface positioned inside the second wall surface, and wherein the hole is provided on the third wall surface and does not extend to the fourth wall surface.

15. The check valve according to claim 14, wherein a plurality of holes are at least provided on the third wall surface.

* * * * *